United States Patent
Becker-Szendy et al.

(10) Patent No.: US 8,751,859 B2
(45) Date of Patent: Jun. 10, 2014

(54) MONITORING LOST DATA IN A STORAGE SYSTEM

(75) Inventors: Ralph A. Becker-Szendy, Los Gatos, CA (US); Veera W. Deenadhayalan, San Jose, CA (US); D. Scott Guthridge, San Jose, CA (US); James C. Wylie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 13/196,904

(22) Filed: Aug. 3, 2011

(65) Prior Publication Data

US 2011/0302446 A1 Dec. 8, 2011

Related U.S. Application Data

(63) Continuation-in-part of application No. 12/777,446, filed on May 11, 2010, now Pat. No. 8,006,126, which is a continuation of application No. 11/747,188, filed on May 10, 2007, now Pat. No. 7,752,489.

(51) Int. Cl.
*G06F 11/00* (2006.01)

(52) U.S. Cl.
USPC .......................... 714/6.1; 714/6.24; 714/807

(58) Field of Classification Search
USPC .................... 714/6.1, 6.24, 766, 807
See application file for complete search history.

(56) References Cited

U.S. PATENT DOCUMENTS

| | | | | |
|---|---|---|---|---|
| 5,504,858 A * | 4/1996 | Ellis et al. | ...................... | 714/6.24 |
| 6,553,511 B1 * | 4/2003 | DeKoning et al. | ........... | 714/6.12 |
| 6,606,629 B1 * | 8/2003 | DeKoning et al. | ..................... | 1/1 |
| 7,020,805 B2 * | 3/2006 | Talagala et al. | ................. | 714/42 |
| 7,051,155 B2 * | 5/2006 | Talagala et al. | ................. | 711/114 |
| 7,103,811 B2 * | 9/2006 | Talagala et al. | ............... | 714/718 |
| 7,146,461 B1 * | 12/2006 | Kiselev et al. | ............... | 711/114 |
| 2003/0145270 A1 * | 7/2003 | Holt | .............................. | 714/766 |
| 2003/0163777 A1 * | 8/2003 | Holt | .............................. | 714/763 |
| 2004/0123032 A1 * | 6/2004 | Talagala et al. | ............... | 711/114 |
| 2004/0153746 A1 * | 8/2004 | Talagala et al. | ................... | 714/8 |
| 2006/0080505 A1 * | 4/2006 | Arai et al. | ...................... | 711/114 |
| 2006/0109792 A1 * | 5/2006 | Broadbent et al. | ............ | 370/248 |
| 2006/0200497 A1 * | 9/2006 | Hu et al. | ........................ | 707/200 |
| 2006/0242540 A1 * | 10/2006 | Cherian et al. | ................ | 714/766 |
| 2006/0248378 A1 * | 11/2006 | Grcanac et al. | .................... | 714/6 |
| 2006/0294299 A1 * | 12/2006 | Edirisooriya | ................. | 711/112 |

OTHER PUBLICATIONS

Article 93*3) EPC Communication, Dated Oct. 9, 2012.

* cited by examiner

*Primary Examiner* — Marc Duncan
(74) *Attorney, Agent, or Firm* — Century IP Group, Inc.; F. Jason Far-hadian, Esq.

(57) ABSTRACT

A data validation method comprises associating a validation chunk with one or more data chunks stored on one or more storage mediums. The validation chunk comprises validation information for verifying whether data recorded in a subdivision of the one or more data chunks is lost. A request is received for an operation to be performed on first data stored in a first subdivision of a first data chunk from among said one or more data chunks. One or more portions of the validation information are examined to determine whether the data recorded in said first subdivision is deemed to be lost.

14 Claims, 9 Drawing Sheets

MONITORING LOST DATA IN A STORAGE SYSTEM

CROSS-REFERENCE TO RELATED APPLICATIONS

This application is a continuation-in-part of U.S. application Ser. No. 12/777,446 filed on May 11, 2010, issued as U.S. Pat. No. 8,006,126 on Aug. 23, 2011 which is a continuation of U.S. application Ser. No. 11/747,188, filed on May 10, 2007, issued as U.S. patent application Ser. No. 7,752,489 on Jul. 6, 2010. The contents of the named applications above are incorporated by reference herein in their entirety.

BACKGROUND

The disclosed subject matter relates generally to fault tolerant data storage systems and, more particularly, to a data storage infrastructure that facilitates scalable monitoring of data.

Disk drives are designed for data storage and retrieval. Disk drives are becoming less reliable in performing these functions with increasing capacities and higher densities. Disk behaviors contribute to corruption or loss of data stored on a disk drive.

A first type of error may occur during a write operation when the disk arm and head fail to align with accurate precision on a track that comprises the physical data blocks on which the data is to be written. Tracking errors can occur if either the head is misaligned such that the data is written to an unintended track or if the head is misaligned so that the data falls in a gap between two adjacent tracks. A Far Off-track Write describes a situation when two physical blocks are placed in error because the target block is not overwritten and so comprises stale data and the overwritten block has lost the data that should be there. A Near Off-track Write describes a situation when one block is placed in error because the target block is not overwritten.

A second type of error that also occurs during a write happens when target bits are not changed on the disk as the result of the write operation. For example, the preamp signal may be too weak to change the magnetic setting of the bits on the platter. In this case, the data remaining on the platter is stale (i.e., the data was not updated according to the write commands issued to the drive). These errors are called dropped writes because the bits are not recorded on the platter.

Both of the above-mentioned types of write errors are called "Undetected Write Errors" because the disk drops the write data in the wrong location and does not itself detect the problem.

A third type of error is caused by a misaligned head placement when reading data. In this case, the disk may read the data bits from a completely unintended track (i.e., Far Off-track Read) or from a gap between two tracks (i.e., Near Off-track Read) and return incorrect data. Both of these errors are typically transient and are corrected when a subsequent read occurs to the same track. In addition, if the tracks are read correctly but on the unintended target of a Far Off-track Write, incorrect data will be returned.

In all the above scenarios, the drive does not detect a problem and returns a successful status notice. Other error scenarios may also occur where the disk returns a success status, but the user or application gets incorrect data. Such write or read errors can be referred to as Undetected Disk Error (UDE).

BRIEF SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

One or more embodiments relate to data storage infrastructure that facilitates scalable monitoring of data. One aspect relates to a data validation method. The method comprises associating a validation chunk with one or more data chunks stored on one or more storage mediums. The validation chunk comprises validation information for verifying whether data recorded in a subdivision of the one or more data chunks is lost. A request is received for an operation to be performed on first data stored in a first subdivision of a first data chunk from among said one or more data chunks. One or more portions of the validation information are examined to determine whether the data recorded in said first subdivision is deemed to be lost.

One aspect relates to a data validation system. The system comprises one or more logic units configured to perform the functions and operations associated with the above-disclosed methods. Another aspect relates to a data validation computer program product. The computer program product comprises a computer readable storage medium having a computer readable program. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE SEVERAL VIEWS OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, data recovery systems and methods in a data storage network are provided to facilitate scalable monitoring of lost data (i.e., data that may not be reliably reconstructed). By way of example, certain embodiments are disclosed herein as applicable to a RAID architecture. It should be noted, however, that such exemplary embodiments should not be construed as limiting the scope of the claimed subject matter, but as examples of possible implementations that are applicable in certain data storage environments.

As an example, in a RAID system, if data stored on a portion of a disk drive is determined to be unreadable, the related data and redundancy information stored on other disks in the RAID system may be utilized to reconstruct the data. If the data cannot be reconstructed, then the data may be reported as lost. In one embodiment, lost data information may be monitored using a 'lost data table' which generally needs to be fully loaded in memory for efficient processing.

Each entry in the lost data table may identify a stripe, a chunk, a sector or other physical subdivision of a track that includes lost data. In storage systems that store large volumes of data, the lost data table becomes drastically large in size and consumes significant amounts of memory space, particularly if the lost data is to be monitored at sector level. Further, since the size of the lost data table is finite, once the entries in the lost data table are exhausted, newly occurring lost data can no longer be monitored, rendering the storage system unusable if data integrity and storage state cannot be verified.

Figure 1:
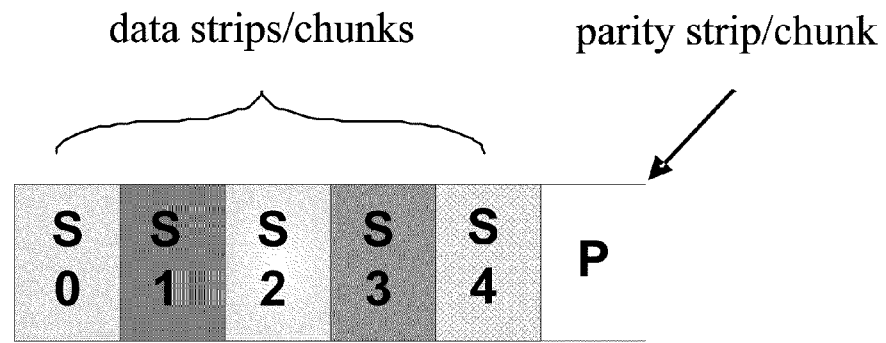
FIG. 1 illustrates an exemplary block diagram of a data stripe comprising multiple data chunks in conjunction with a parity chunk, in accordance with one or more embodiments.

Referring to FIG. 1, a data stripe comprising data strips/chunks S0 through S4 is illustrated in conjunction with a parity chunk P. The term "strip" or "chunk" refers to a unit of data or parity from a single disk. A strip or a chunk may comprise one sector, or multiple contiguous sectors on a disk. In an exemplary embodiment, (e.g., in the context of a RAID system), a stripe may comprise an integral number of chunks (e.g., one chunk), wherein each chunk comprises one or more sectors.

Figure 2A:
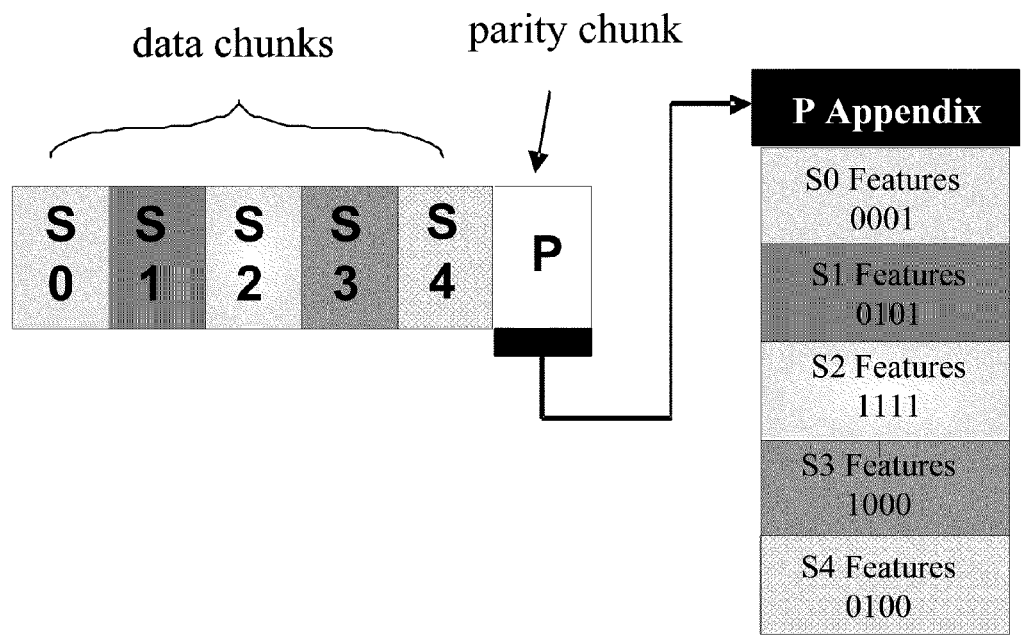
FIGS. 2A and 2B are exemplary block diagrams showing one or more data chunks with a parity chunk P and an associated appendix that comprises metadata for the one or more data chunks, in accordance with one embodiment.

The size of a chunk, depending on implementation, may be selected to balance storage overhead, IO cost overhead and other factors in a one or more embodiments. The term "appendix" refers to a unit of data (e.g., a sector or a subsector) that is, for example, appended to a chunk. Referring to FIG. 2A, an appendix may comprise metadata (e.g., features S0 through S4) for one or more data chunks.

A data appendix may comprise the features for the data chunk to which the appendix is appended. An appendix for a parity chunk may comprise the features for one or more data chunks that contribute to the parity value. A data chunk may comprise metadata in at least one parity chunk per disk that it touches. Accordingly, when a parity chunk is read along with its appendix, the features for one or more of the data chunks related to that parity are also read.

In some embodiment, at least one parity chunk per disk has an appendix that comprises the metadata for one or more or possibly all data chunks. That is, the features for a data chunk stored in a parity appendix can be compared to the data (and optionally to the data's features stored in the data chunk's appendix) to validate consistency of the data with its features.

The features for a data chunk may comprise checksums of the data chunk (e.g., LRC, CRC, hash or other summary of the data chunk's contents), or may comprise the physical or logical block address of the data chunk, whether embedded in or separate from the checksum. In some embodiments, the features may comprise sequence numbers or timestamps that provide an ordering of the updates to the data chunk or other types of metadata that can be associated to the data chunk. In some embodiments, a data chunk may comprise its history and content, for example.

In one embodiment, checksums or sequence numbers may be utilized without limitation. The size (i.e., the number of bits or bytes) of the features can be selected among many possibilities but is generally constrained by the size of a parity chunk's appendix and the number of data chunks that contribute to the parity value. It may also be constrained by additional factors. For example, some SCSI disks can be formatted with 520, 524 or 528-byte sectors. And, in some embodiments, one or more of the bytes in an oversized sector beyond a standard 512-byte user sector may be used for an appendix.

In the foregoing, exemplary embodiments are provided in the context of a RAID4 system which comprises a fault tolerant, XOR-based erasure code. It is noteworthy, however, that depending on implementation the teachings provided here can be applied to other fault tolerant erasure codes as well, both Reed-Solomon (or finite field) based as well as XOR-based. The scope of the invention should be construed to cover storage systems based on other fault tolerant schemes.

Referring back to FIG. 1, in a RAID4 array, there are a plurality of data disks (e.g., disks S0 to S4) and preferably one parity disk (e.g., disk P0). Each data disk and the parity disk may be divided into subunits called strips (or stripe units) of a predetermined size. Horizontally, the set of strips at the same logical offset collectively form a stripe. The data stored in the data strips are XORed (exclusive ORed) together to compute the value stored in the parity stripe of that stripe.

In one embodiment, parity information may provide a summary of multiple blocks of data (generally from different disks) in the stripe. A validated read may be employed where the data that is read from disk for return to a computing system (e.g., host) can be checked for UDE detection. Additional data validation may be accomplished by using additional but minimal disk overhead.

A UDE may be, for example, detected when data is read from one or more disk drives (i.e., disks), for example, to write new data to a stripe to prevent migration of bad data or hiding bad data that a parity scrub can no longer detect. When data is read from the disks for the purposes of a write (for example, in a read-modify-write operation), parity may be also read.

In one embodiment, the stripes are subdivided into one or more "chunks." A chunk may be a strip or a portion (e.g., a sector) of a strip with multiple chunks comprising a single strip. In one implementation a chunk may comprise a single sector, so there are as many chunks in a strip as there are sectors in the strip. In another implementation, a strip comprises a single chunk, so there is one chunk per strip and the chunk comprises the same number of sectors as a strip. In yet another implementation, a strip comprises more than one chunk, and each chunk comprises more than one sector.

In the following, several exemplary error detection and recovery methods are provided, and for the purpose of brevity, a chunk is considered to comprise a strip, by way of example. It should be noted, however, that the scope of the invention should not be construed as limited to the following exemplary embodiments, as the concepts and teachings provided herein are equally applicable to any fault tolerance data storage and data recovery system.

Parity Appendix

Referring to FIG. 2A, in one embodiment, a parity chunk has an appendix (e.g., parity appendix) adjoined to it. For example, when there is one parity chunk on the disk, each data chunk feature (e.g., S0 Features, S1 Features, . . . , S4 Features) is stored in the parity chunk appendix (shown as the P Appendix).

A feature may comprise at least a checksum of the corresponding data chunk. For example, when a data and a parity chunk are read for a read-modify-write operation to the data chunk, the parity appendix is also read. This may possibly and marginally increase the length of the parity IO but will not increase seek costs or disk accesses.

The checksum of the data chunk is computed from the read data and compared to that stored with the parity in the parity appendix. If the checksums agree, no UDEs have occurred and the operation can continue. If the checksums disagree, a UDE has occurred and the operation may terminate with error condition, because it may not be able to reliably continue without determining the cause of the UDE.

As shown, a simple two IO check is functionally equivalent to a five IO check (read 4 data chunks and the parity chunk) of a full parity scrub. Thus, it needs to be determined whether an error has occurred at the data chunk or at the parity chunk. As provided in more detail below, other means are needed to determine an additional course of action in an attempt to cure the error and complete the write. In some embodiments, if other data chunks are read and their checksums are compared to those features stored with the parity appendix, it may be possible to determine if the parity appendix is faulty (i.e., had a UDE).

The operation of reading the remaining portion of the stripe for the purposes of locating the error after first stage detection may be referred to as a complementary full stripe validate. For example, assuming that one disk is faulty and causing UDEs, then the parity is faulty if the checksums in the parity are inconsistent with two data chunks in the stripe. In such a case, the parity may be recomputed from the data chunks and the UDE can be repaired. In this embodiment, marginal additional storage overhead is introduced, but significant performance and additional correcting power are provided in comparison to a traditional data recovery algorithm (e.g., RAID5).

In one embodiment, to validate that the parity was written correctly, a checksum of the parity may be stored in the parity appendix. For example, on a read of the parity (e.g., in the context of a read-modify-write of data as described above), a recomputed checksum of the parity is compared with value stored in the appendix. If they match, then the parity and its appendix are written atomically.

In one embodiment, when a host read is issued to the array, the system may return unchecked data to the host by reading the data chunk. Alternatively, a more reliable validated read may be performed by reading the data chunk and the parity appendix, comparing a computed checksum of the read data and the stored checksum of the parity appendix and returning validated data if the checksums agree. This provides a reliable and efficient means to validate data during reads.

When the checksums do not agree, an error-handling algorithm may be applied. In accordance with one embodiment, a parity atomicity check is applied.

If the parity check fails, then the parity appendix is incorrect. In one embodiment, a parity scrub may be applied to confirm whether or not the parity appendix is corrupt. If so, the parity appendix is recreated, and the read data may be returned to the host.

If the parity atomicity check succeeds, then a complementary full stripe validate (CFSV) operation may be performed. In this operation, one or more remaining data chunks in the stripe are read and their checksums are validated. If at least one of the checksums does not match, then the parity and the parity appendix are declared invalid and are reconstructed. And, preferably, the read data can be returned to the host.

In one embodiment, when a data/parity appendix metadata mismatch is detected in the stripe for the original read data, then an error is detected and either the data is incorrect or the parity and its appendix are incorrect. It may not be possible to disambiguate between these two cases, so a data loss event is declared and no data is returned to the host. In the error cases, an error report can be generated indicating, if possible, the drive where the error was located. An exemplary algorithms for detection and error handling (including possible location and correction) in the context of other operations such as short write, full stripe write, promoted full stripe write and rebuild is provided in further detail below.

In accordance with one aspect of the invention, it is determined whether a validated read or a normal (invalidated) read is needed. Depending on implementation, a user may be provided with the option to request or refuse validation. Alternatively, the validation may be performed either randomly or periodically. In one embodiment, the system, for performance reasons, may have validated reads turned off by default and at regular or random intervals (e.g., either in IO sequence or temporally) and perhaps on a per drive basis or on an array basis, convert normal reads to validated reads.

Not requesting a read validation at every instance provides better overall performance and an added level of scrutiny on the quality of the data integrity. In accordance with an exemplary embodiment, for performance reasons, validated reads may be turned off by default. When sufficient errors are detected during writes (e.g., in read-modify-write) and a certain drive can be determined as suspect, then validated reads may be enabled for host reads on a suspect drive, for example. If one or more suspect drives are not identifiable then validated reads may be turned on for all drives, for example.

In a certain embodiment, when a full stripe write is issued from the host, the parity and the checksums for the data are computed and written to the disk. Preferably, no error checking is performed since no data is read from the disks. If the features comprise a sequence number, the sequence numbers for the data may be set to a fixed value (e.g., zero) and the data and the respective features can be written to the disks without knowing the values of the sequence numbers when the host full stripe write is issued.

Accordingly, no checking may be needed in the above scenario and a full stripe write can be used to refresh the data and parity in the stripe. Alternatives to a fixed value assignment include (a) a random value, in the same or a separate range from those assigned sequentially or (b) a sequential value for the entire stripe maintained either in memory (volatile or non-volatile) or on disk in some special location. In the volatile memory version, the volatile values can be restored after power cycle by either flushing the values to disk (e.g., using a firehose dump and then restoring on power-up) or read preemptively or on-demand or piggybacked on any read from the stripe.

When a host issues a write IO that is smaller than a full stripe write, the storage system may choose to implement it as a read-modify-write operation or may choose to implement it as a promoted full stripe write (or a partial promotion might be done in RAID6 with "parity compute" implementation of write). In this scenario, some data may be overwritten by the host operation, and the storage system may read the dependent data from the stripe that will not be overwritten.

In one embodiment, the dependent data is used along with new data from the host to compute parity as if for a full stripe write. That is, old parity may not be read from disk, and may be instead overwritten. In accordance with one embodiment, one extra read may be added to collect the features for dependent data, validate that data's correctness and complete the IO, if the data is validated. If the data is not validated, then the error path may include re-implementing the operation as a read-modify-write and failing the IO if that also fails to validate the data read from disk.

A parity appendix may provide validation of data in the absence of any disk failures (e.g., total loss of a disk or a hard sector error where the no data on a disk can be accessed). When disk failures occur, UDEs may not be detected and reconstruction of lost data may propagate or perpetuate additional UDE errors. For example, if the parity disk is lost, then there are no features available to validate the remaining data. Recomputation of parity must assume but cannot guarantee that the data chunks are correct and no UDEs had occurred.

Similarly, if data is lost, a check of the consistency of the remaining data against the features stored in the parity appendix may not reliably indicate if a UDE has occurred. It may be that the features were consistent but the parity was dropped when a failed disk was last updated. Thus, reconstruction of the lost data may not guarantee that correct data is restored. However, if two or more features are inconsistent and one or more disks are dropping writes, then the parity chunk is inconsistent and the remaining data is correct. This means that the lost data may not be reliably reconstructed.

In some embodiments, a data structure may be utilized to keep track of lost data. For example, if data recorded on a sector of a disk drive is determined to be lost, then an entry in the data structure may be utilized to indicate that the data on the respective sector is lost. Thus, when a request is received to read data from a sector, the entries in the data structure (e.g., a lookup table) may be consulted to determine whether the data recorded on the target sector is lost.

Using a data structure of a finite size, such as the lookup table, may be undesirable in data storage systems that store large volumes of data. This is because in large-scale storage systems, the number of lost sectors may eventually exceed the number of entries in the lookup table. In such a scenario, the ability to monitor newly occurring lost data may be limited until additional entries in the lookup table become available. Larger lookup tables may be utilized for large-scale storage systems. However, such implementation may result in the lookup table consuming a very large amount of memory space which results in associated inefficiencies and overhead.

To achieve a more efficient and scalable outcome, in one or more embodiments, a lost data identifier (e.g., a flag—without limitation, hereafter referred to as a lost data bit by way of example) may be associated with each sector that includes lost data. Referring to FIG. 2A, depending on implementation, the lost data bit may be included in an appendix of the parity chunk P (i.e., the P Appendix) or alternatively in metadata associated with one or more of the data chunks S0 through S4. For instance, if data chunk S0 includes four sectors, then four lost data bits may be included in the P Appendix in association with data chunk S0, wherein each lost data bit is associated with a corresponding sector in data chunk S0.

Accordingly, in the exemplary embodiment illustrated in FIG. 2A, twenty lost data bits may be included in the P Appendix (i.e., four lost data bits for each of the five data chunks S0 through S4). As shown, each of the four lost data bits may be included in the corresponding S features for each data chunk, respectively. For chunk S0, for example, the four lost data bits (e.g., represented as '0001') may be included in the corresponding S0 features; for chunk S1, the lost data bits (e.g., '0101') may be included in the corresponding S1 features, and so on.

Figure 2B:
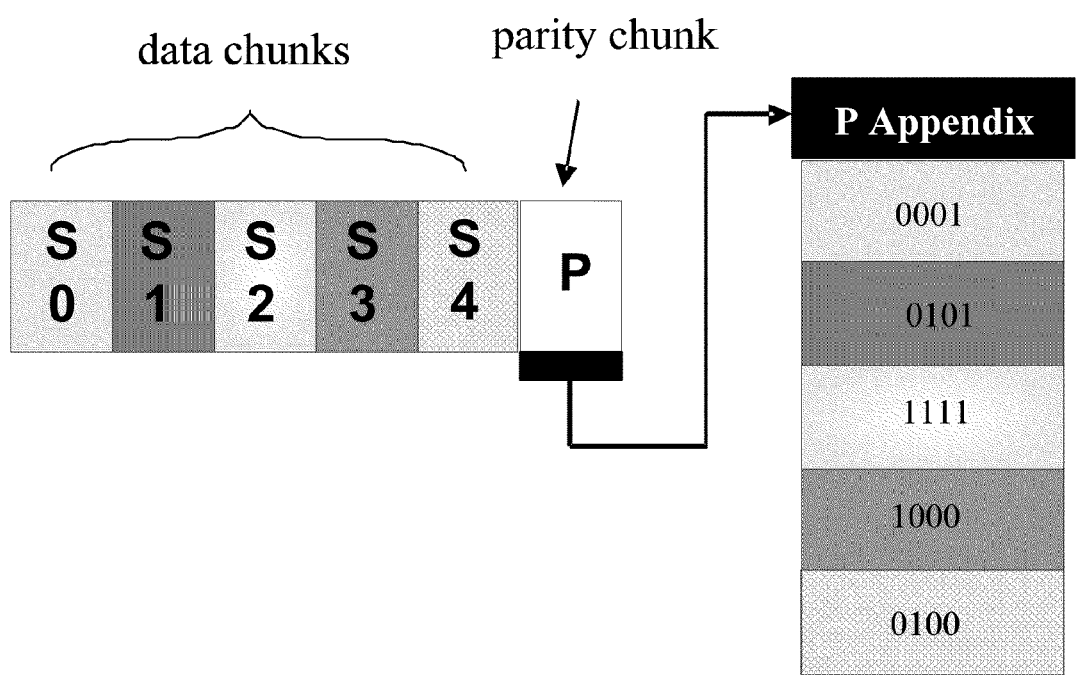

In the example, shown in FIG. 2A, where lost data bits 0001 are included in the S0 features, the fourth bit is set to 1, indicating that the fourth sector in chunk S0 includes lost data. As another example, the lost data bits 0101 in S1 features for data chunk S1 indicate that the second and fourth sectors in data chunk S1 are lost. It is noteworthy that the lost data bits, in some embodiments, may not be part of the S features. That is, the lost data bits may be included in the P Appendix, as shown in FIG. 2B, without the presence of the S features or any other metadata.

Accordingly, when a read operation is performed, the lost data bit for a sector is also read (during the same read or separately depending on implementation). If the lost data bit indicates that the data in the read sector is lost, then the system takes the appropriate action by generating an error message, for example. When data stored on a sector that is recorded as lost is updated (e.g., by way of writing new data to that sector), the respective lost data bit is reset to indicate that the overwritten sector no longer includes lost data and the corresponding parity in the P Appendix is also updated.

Data Parity Appendix

Figure 3:
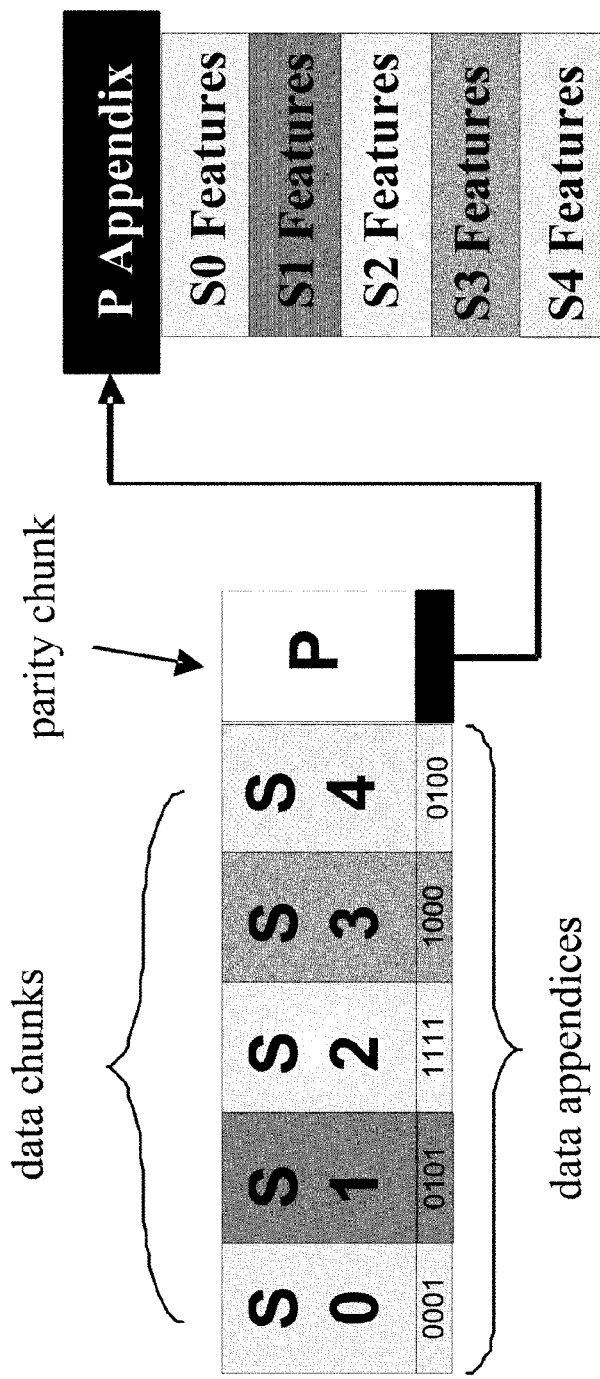
FIG. 3 illustrates a block diagram of one or more data chunks and associated data appendices together with a parity chunk P and its associated parity appendix wherein each data appendix comprises metadata for its associated data chunk and the parity appendix comprises metadata for the one or more data chunks, in accordance with one embodiment.

Referring to FIG. 3, in another embodiment, each data chunk may have an appendix (e.g., data appendix) comprising its own features and each parity chunk may comprise the features set for one or more of its data chunks. In this embodiment, the lost data bits for each data chunk may be included in the respective data appendix. As shown in FIG. 3, for example, data appendix for data chunk S0 includes four lost data bits '0001' respectively associated with four sectors in data chunk S0. Data chunks S1, S2, S3 and S4 include '0101', '1111', '1000', '0100' as their respective lost data bits.

In one embodiment, the P Appendix may include a parity protected bit for the lost data bits. For example, in FIG. 3, since each data chunk has four lost data bits, the P Appendix will have four parity bits (not shown) that may be used to parity-protect the respective lost data bits in the data appendices. That is, for example, a parity bit in the P Appendix may be used to parity-protect the lost data bit of sector 1 in data chunk S0 (e.g., 0), the lost data bit of sector 1 in data chunk S1 (e.g., 0), the lost data bit of sector 1 in data chunk S2 (e.g., 1), the lost data bit of sector 1 in data chunk S3 (e.g., 1), and the lost data bit of sector 1 in data chunk S4 (e.g., 0). Such parity protection of lost data bits allows the storage system to reliably remember lost data even if the data appendix becomes unreadable due to media errors or disk failures.

In one implementation, in order to track whether data stored in a parity chunk is lost, the lost data bits for a data chunk (e.g., S0) are stored in the data appendix for the data chunk and further the lost data bits for each data chunk are replicated in the P Appendix. This replication of the lost data bits in the P Appendix (as opposed to parity protecting the lost data bits) provides an extra copy of the lost data bits for S0 to S4 in the P Appendix and allows for recording lost data bits for the parity chunk P as well, if needed.

Figure 4:
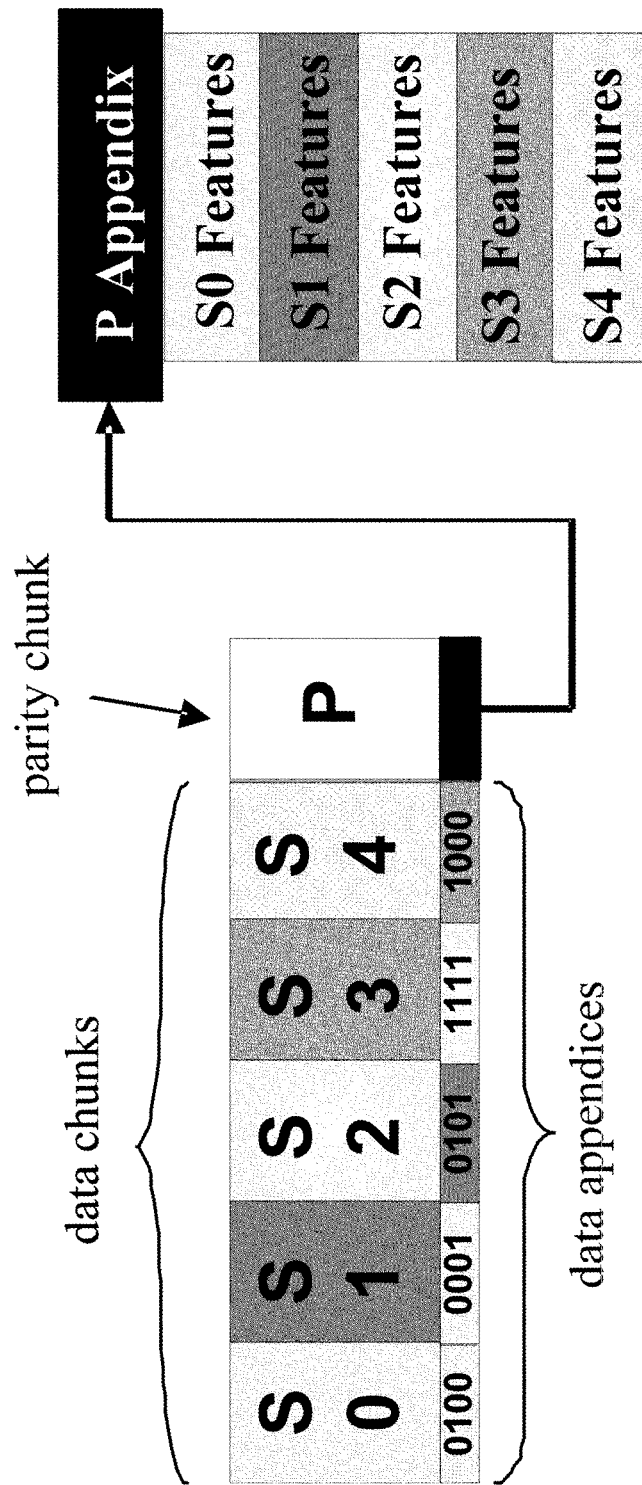
FIG. 4 illustrates a block diagram of one or more data chunks and associated data appendices together with a parity chunk P and its associated parity appendix wherein each data appendix comprises metadata for an unassociated data chunk and the parity appendix comprises metadata for the one or more data chunks, in accordance with one embodiment.
Figure 5:
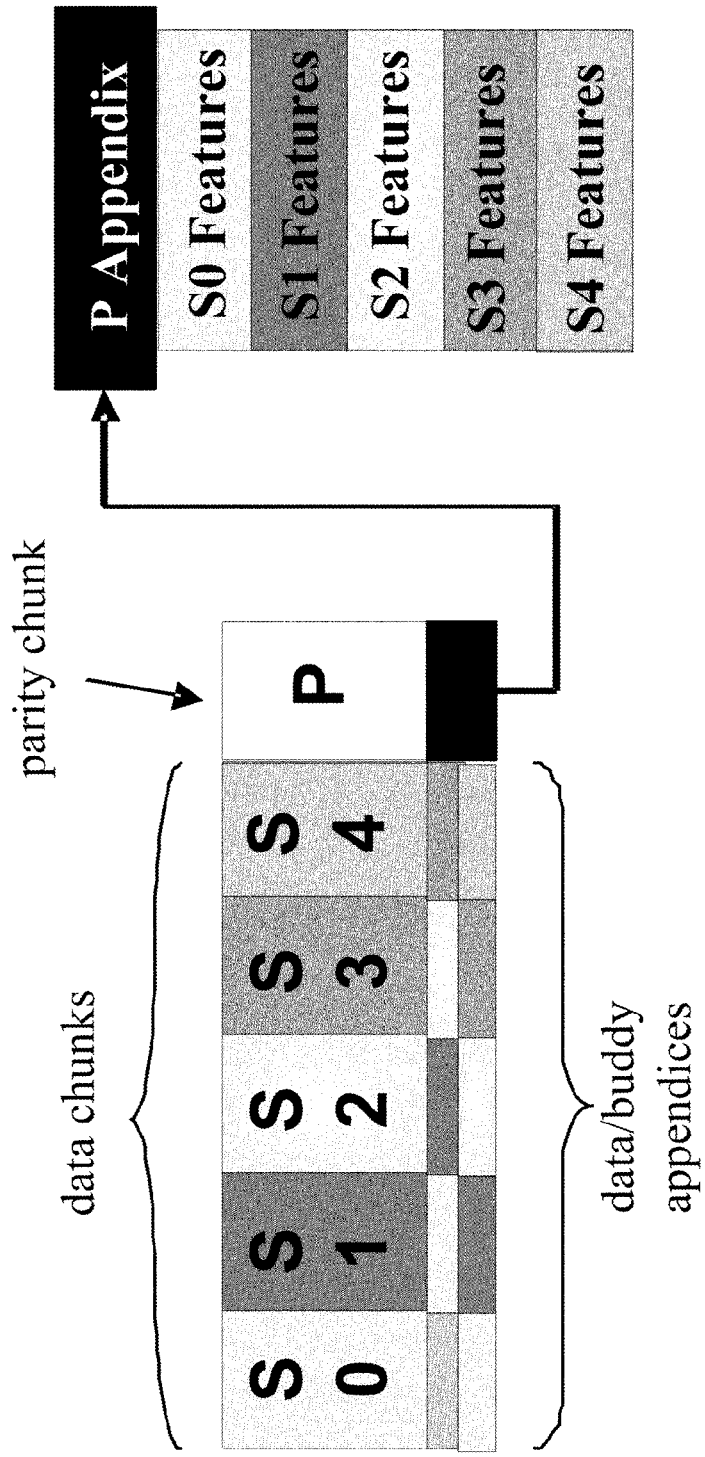
FIG. 5 illustrates a block diagram of one or more data chunks, wherein the features for a data chunk can be stored in FIG. 6 illustrates the block diagram of FIG. 2A having an additional parity chunk Q and an associated appendix, in accordance with one embodiment.

Referring to FIGS. 4 through 5, as provided in further detail below, the same or a similar implementation may be applied to include lost data bits in the respective appendices for each lost sector in a data chunk. It is noteworthy that the embodiments disclosed herein are provided by way of example as applicable to monitor lost data at sector level. In other embodiments, the lost data may be monitored at other levels, such as a stripe, a chunk or other physical subdivision of a track that may include lost data.

Given that each stripe has an appendix, the disclosed embodiments scale well with the increase in size of the underlying disk drives and are not subject to the scaling limitations of a fixed size lost data table. Particularly, in cases where an embodiment uses an appendix for data integrity validation, the additional space required to store the lost-data information in the appendix is minimal.

Buddy Parity Appendix

Referring to FIG. 4, when a parity disk is lost, a data or UDE parity can be detected, located and corrected, using a scheme (e.g., buddy parity appendix) implemented in accordance with another embodiment. In such embodiment, the parity appendix comprises the lost data bits or features for one or more data chunks in the parity, such that each data chunk is, preferably, paired with a data chunk buddy so that a copy of the features for a data chunk is stored in the appendix of its buddy. In other words, instead of each data chunk being paired with its own data appendix (e.g., S0 being paired with S0 appendix) a data chunk is paired with another data chunk's data appendix (e.g., S0 is paired with S4 appendix).

One exemplary method of assigning a buddy is via a simple next neighbor relation, with or without rotation. For example, in an array with four data disks, a data chunk on disk 1 has as its buddy the data chunk on disk2, a data chunk on disk2 has as its buddy the data chunk on disk3, a data chunk on disk3 has as its buddy the data chunk on disk4 and a data chunk on disk4 has as its buddy the data chunk on disk1. Other methods are also possible for buddy assignments (e.g., pairings) without detracting from the scope of the invention.

In this embodiment, the features may comprise a checksum. To verify accuracy of data read, a data chunk can be checked against the checksum stored in the appendix of the parity chunk. If there is no inconsistency, then the operation may proceed. Otherwise, the buddy's appendix may be read and used to determine whether the data chunk or the parity chunk is in error. The chunk consistent with the buddy appendix is assumed to be the correct one.

The intermediate operation of reading the buddy can be used to optimize an error-handling algorithm. In other words, a majority vote among the three members (the data chunk, the buddy appendix and the parity appendix) determines which member is in error. Accordingly, a UDE can be detected, located and corrected, when no disks have failed. However, when one disk is lost, this embodiment is implemented such that two features are available for comparison. Thus, when a disk or a parity disk is lost, UDEs can be detected and located. Advantageously, no additional storage overhead is needed in comparison to the earlier discussed methods. An additional write (and possibly a read) operation may be needed in some embodiments to update the buddy's appendix during a write.

In one embodiment, the S feature sets may comprise, for example, a timestamp or a sequence number that indicates an ordering of the writes to each data chunk. When a data chunk and its parity chunk are read, the timestamps or sequence numbers are compared. If they agree, then the data and parity are correct and can be used as required (for example for a read-modify-write or for a validated host read).

If the timestamp or the sequence number information are inconsistent, then the most recent value points to the correct data or parity and the older timestamp points to the UDE. Accordingly, a UDE can be detected and located by way of the above-noted data parity checking process. Once a UDE is located, the data (or parity) can be assumed to have been lost or erased and a recovery algorithm can be applied to retrieve the correct data. Thus, the data parity appendix has the additional feature over and above that of the parity appendix in being able to locate and correct UDEs.

Data Buddy Parity Appendix

Referring to FIG. 5, yet another embodiment may be implemented so that the lost data bits or the S features for a data chunk can be stored in at least one or more of the following locations: (a) in the parity appendix, (b) in the data chunks' appendices and (c) in a buddy's appendix of the data chunks. As such, this embodiment provides a higher level of redundancy for data recovery and correction. In one embodiment, the features may comprise a sequence number or timestamp. Accordingly UDE detection, location and correction can be provided when either a data disk or the parity disk is lost.

In certain embodiments, a data chunk's metadata (e.g., lost data bits) may be stored in the appendix of more than one buddy. In another embodiment, a data chunk's metadata may be stored in every data chunk's appendix. In such embodiment, the contents of a parity chunk's appendix are replicated in every data chunk appendix, for example. Maintaining metadata for a data chunk in multiple buddy appendices may induce additional write operations, since a copy of the metadata may be updated with every write.

The additional write operations may be mitigated by a lazy update process which works in conjunction with sequence numbers (or other generation number, timestamp or other ordering tags) as provided in more detail below. The erasure code may tolerate the loss of one disk (i.e., one strip). Consequently, if a short write updates one buddy appendix with the most recent sequence number, then in the presence of a disk loss, there will be one "most recent" copy (either the parity chunk appendix's copy or the buddy's or both).

In one embodiment, a read of one or more of the appendices determines the most recent value, providing a check against data read from the stripe. Accordingly, if the erasure code tolerates T disk/strip losses, then T+2 may be updated during each write operation. Preferably, one copy is stored in the data chunk appendix and T copies are stored with the affected parity chunks. As such, a buddy appendix is updated during a short write. T parity chunks may be made available in an exemplary embodiment that has a T fault tolerant code.

The above-mentioned embodiments may be implemented to apply to various fault tolerant systems (e.g., RAID 4, RAID5, RAID6, etc.) with additional functionality to detect, locate and correct UDEs. In a higher fault tolerant system, a data chunk may be represented in more than one parity chunk. Consequently, each data chunk's features may be stored in more than one parity chunk appendix. As noted earlier, the additional redundancy of the data chunk features provides for additional detection/location/correction power.

Figure 6:
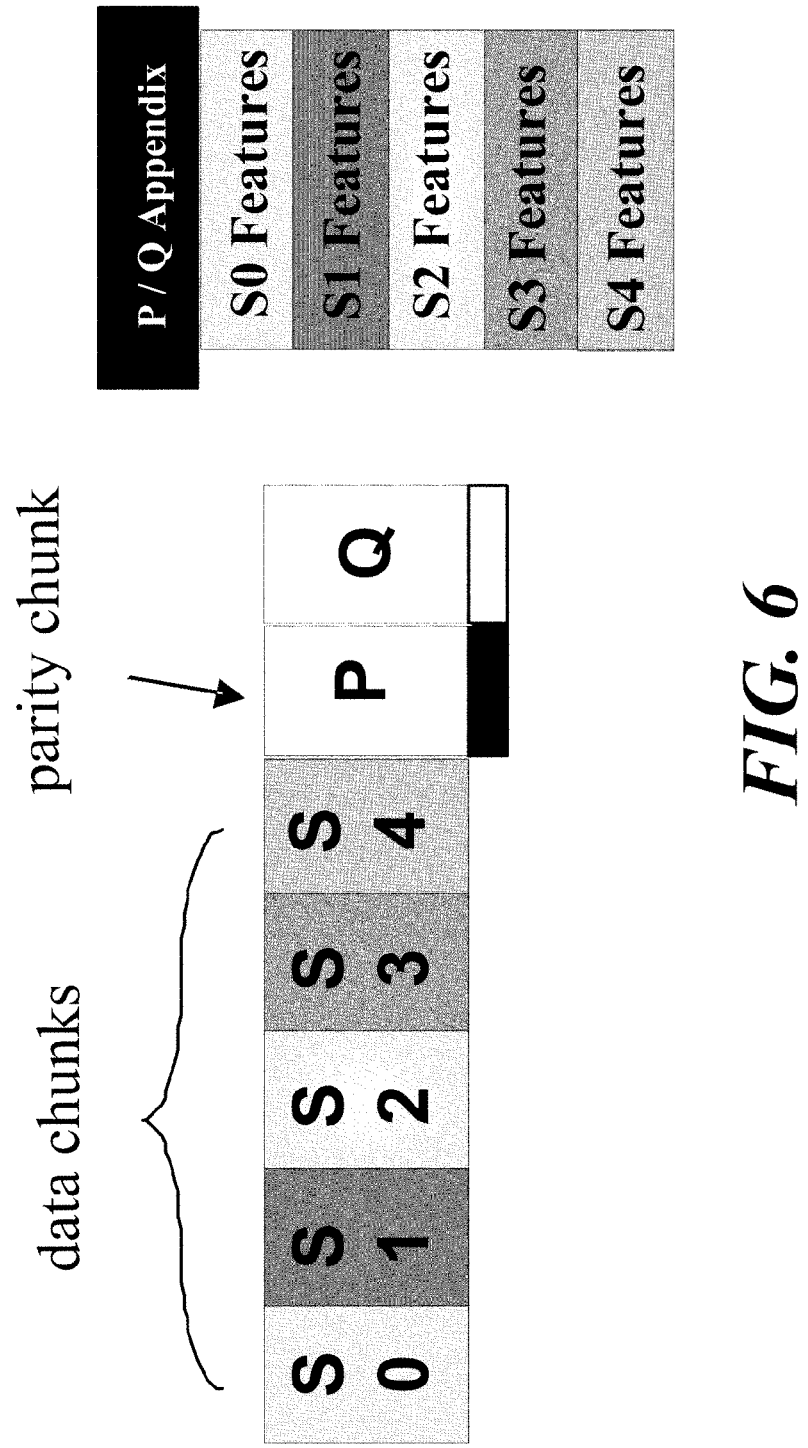

Referring to FIG. 6, for example, in a RAID6 system, implemented say by a Reed-Solomon code or other code using finite field arithmetic, a parity appendix may have two copies of each data chunk checksum. When a data chunk is read for a read-modify-write, both parity chunks are also read in the normal course of the operation. The invention requires reading also the appendices for the two parity chunks. A consistency check of the data chunk's computed checksum and the two stored checksum will determine (by majority vote) if one of the chunks experienced a dropped and which one.

In the case of detection and location, a RAID6 algorithm can reconstruct the incorrect data. However, location is not required in RAID6 when no disks have failed. Once a UDE is detected, the RAID6 location and correction algorithm can be applied. In an exemplary embodiment, a majority vote is not needed for location and correction. When one data disk is lost, the majority vote method may be used to detect, locate and correct.

In certain embodiments, when a parity disk is lost a parity appendix (e.g., for RAID5) may be utilized with no disks lost (e.g., when one of the checksums is lost). However, in the case where more than one data disk is lost, a parity appendix may be used to detect and locate the UDEs. Similar analysis may be applied to the above-described embodiments when extended to, for example, RAID6 or other fault tolerant recovery algorithms.

A recovery algorithm may be based on XOR computations such as an EVENODD scheme, in accordance with one or more embodiments. The EVENODD scheme is an efficient parity placement scheme for tolerating multiple disk failures in, for example, a RAID architecture. The codes of the EVENODD scheme are optimal block codes based on XOR operations which make the complexity of the EVENODD scheme simpler than other schemes that require computation over finite fields.

Figure 7:
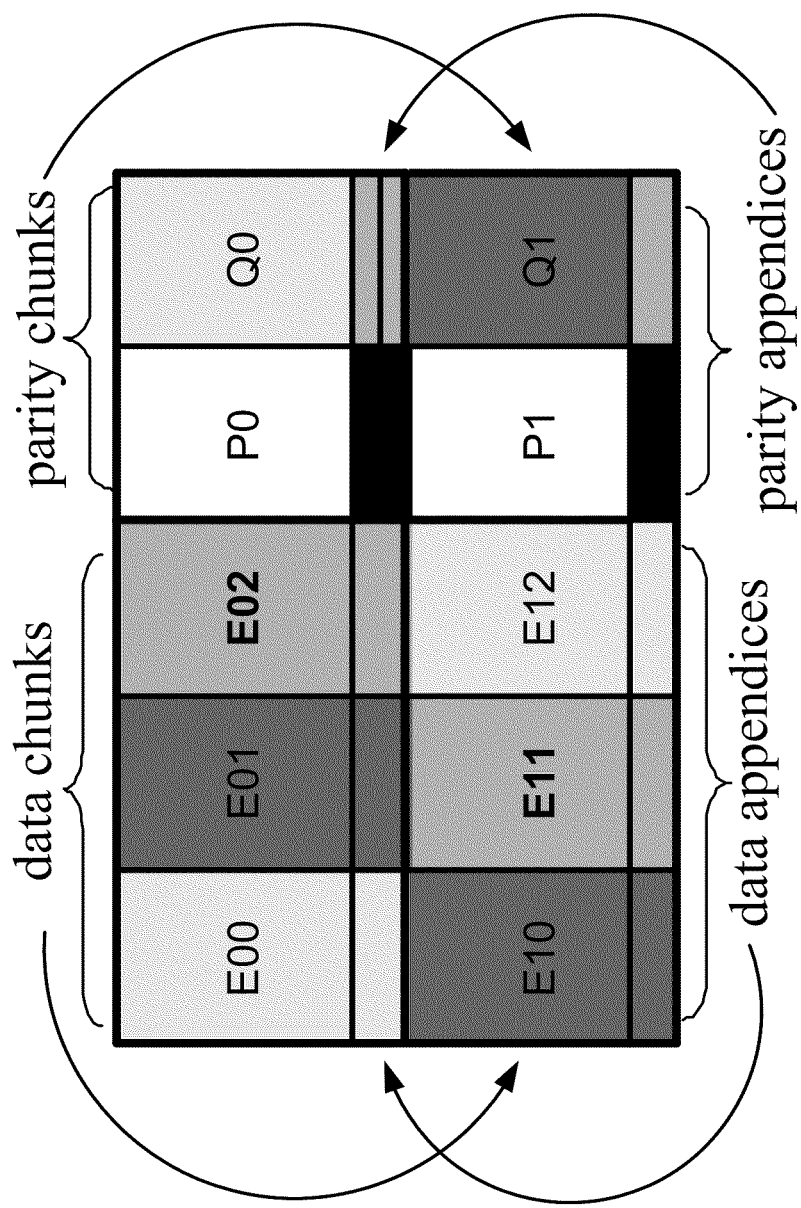
FIG. 7 is an exemplary block diagram of data chunks and parity chunks in a fault tolerant storage system in which a parity appendix comprises metadata for the data chunks that contribute to the XOR calculation of the parity chunks value, in accordance with one embodiment.

Referring to FIG. 7, in exemplary embodiments, a parity appendix may comprise metadata (e.g., lost data bits) for the data chunks that contribute to the XOR calculation of the parity chunks value. The embodiment depicted in FIG. 7 may be utilized for an EVENODD code with parameter prime p=3, for example. Each chunk may represent elements in the XOR computation rules. The element may comprise an integral number of chunks, greater than one. In another exemplary embodiment, the data elements on each disk may be combined into a single chunk.

As shown in FIG. 7, in an exemplary embodiment, the layout may be similar to that of a Reed-Solomon, where parity value P0 is computed as the XOR of E00, E01 and E02; parity value P1 is computed as the XOR of E10, E11 and E12; parity value Q0 is the XOR of E00, E12 and E11, E02; parity value Q1 is the XOR of E10, E01 and E11, E02, for example. The appendix for P0 comprises the metadata for E00, E01 and E02 (e.g., the chunks that contribute to its value).

In the exemplary embodiment shown, the appendix for P1 comprises the metadata for E10, E11 and E12. The appendix for Q0 comprises the metadata for E00, E12, E11 and E02. Finally, the appendix for Q1 comprises the metadata for E10 and E01 and may optionally comprise the metadata for E11 and E02. As such, each data chunk's metadata appear in two parity appendices on separate disks. Data chunks E11 and E02 appear in the parity computations for both Q0 and Q1, so their metadata may appear in the appendices for Q0, Q1 or both.

Another exemplary embodiment may apply to a RAID1 architecture having disks that provide data redundancy by mirroring data stored on other disks in the storage system. The data on each disk is divided into chunks of some predetermined size, preferably, the same size on each disk. Corresponding data chunks on each disk comprise identical data values. When a UDE occurs during the update of a data chunk, one disk will comprise the new data for the chunk and the failing disk will comprise stale or corrupted data.

In one embodiment, each data chunk is adjoined with an appendix that comprises a sequence number for that data chunk. The sequence number is incremented each time the data is written. When reading the data, both mirrored chunks and their appendices are read. The sequence numbers are compared and if they agree, then no UDEs have occurred and the data can be returned to the host. If the sequence numbers differ, then the data chunk with the higher sequence number is presumed to be correct and can be returned to the host.

The data chunk with the lower sequence number is presumed to be stale (i.e., due to an UDE) and can be repaired by rewriting the good data over the stale data, and preferably updating the sequence number. During a write operation, one or more data appendices may be read to determine the current sequence number and if needed validate the larger value if in fact they differ. The sequence number is then incremented and the new data is written to each data chunk mirror along with the updated sequence number.

In summary, one or more embodiments may be implemented to apply to RAID architectures that provide redundancy of the data, such as RAID1, RAID4, RAID5 and RAID6. In some embodiments, data and parity strips in a RAID stripe are divided into chunks. Chunks may be sectors, multiple sectors or complete strips. For a data chunk, metadata (i.e., features) are generated. Metadata may comprise one or more checksums (e.g., LRCs, CRCs, hashes, etc.), logical or physical block address and/or sequence number values (e.g., timestamps, generation numbers, etc.) that may be stored separately or encoded together to reduce the size, in bits or bytes, of the metadata.

Appendix space is, preferably, allocated to or associated with a parity chunk and optionally with a data chunk. When one or more copies of the metadata for a data chunk are stored in buddy data appendices, an appendix may comprise the header bytes of oversized sectors. Depending on implementation, a copy of the metadata for a data chunk may be stored in one or more of the following locations: (a) in the appendix for at least one parity chunk per disk whose value is computed from the given data chunk; (b) in the appendix of the data chunk itself; and (c) in the appendix of one or more additional data chunks (i.e., buddies).

In one embodiment, when an appendix is a sector or subsector such that the writing a data chunk and its appendix cannot be guaranteed atomicity and consistency, then the appendix of the data chunk comprises a checksum of the data in the data chunk to provide an atomicity check. The disk drives provide atomicity guarantees when the appendix is in the header bytes of an oversized sector.

During a read operation of data, one or more copies of the metadata may be optionally read to verify the consistency of the data with its metadata. When a mismatch occurs location algorithms can be applied. The location algorithms may determine that (a) a data chunk is invalid, (b) a parity chunk is invalid (c) some appendix is invalid. To make such determination, the algorithms may read one or more or all of the remaining copies of the metadata or read other data and one or more copies of their associated metadata in order to determine the source of the error. When the error is located, in the absence of too many disk failures, the data may be reconstructed by, for example, a RAID recovery algorithm.

During a write operation implemented as a read-modify-write where the data and its associated parity are read and the parity is updated, the parity appendices are read (as is the data appendix if it comprises the data's metadata) and the metadata for the data is verified. When a mismatch occurs, location algorithms can be applied. When no mismatch occurs, the data's metadata is updated and stored with the parity update and with the data update if the data appendix comprises its own metadata. In addition, if the data's metadata is stored in the appendix of one or more buddies, then one or more of said appendices are also updated.

In one embodiment, during a promoted full stripe write, data that read from a stripe is verified against one or more copies of the metadata also read from one or more appendices. If a mismatch occurs, other location algorithms are employed to determine the source of the mismatch. If no mismatch is found, the metadata for the new data is updated and stored in the associated appendices along with the updated parity values.

During a full stripe write, new metadata is generated along with one or more new parity values and stored in the appropriate appendices. If sequence numbers are used, a particular sequence number may be used in order to mitigate the requirement to read one or more appendices to get the current sequence numbers for all the data. This particular sequence number may be a fixed value or may be generated randomly or may be stored in memory for quick access. A single sequence number may be maintained for each stripe. Preferably, data's metadata have the same sequence number during a full stripe write.

In one embodiment, when metadata is checked, validated reads may be enabled by default, by user setting, by periodic or random triggers or automatically against a suspicious drive or drives when some errors are detected during write operations.

Figure 8:
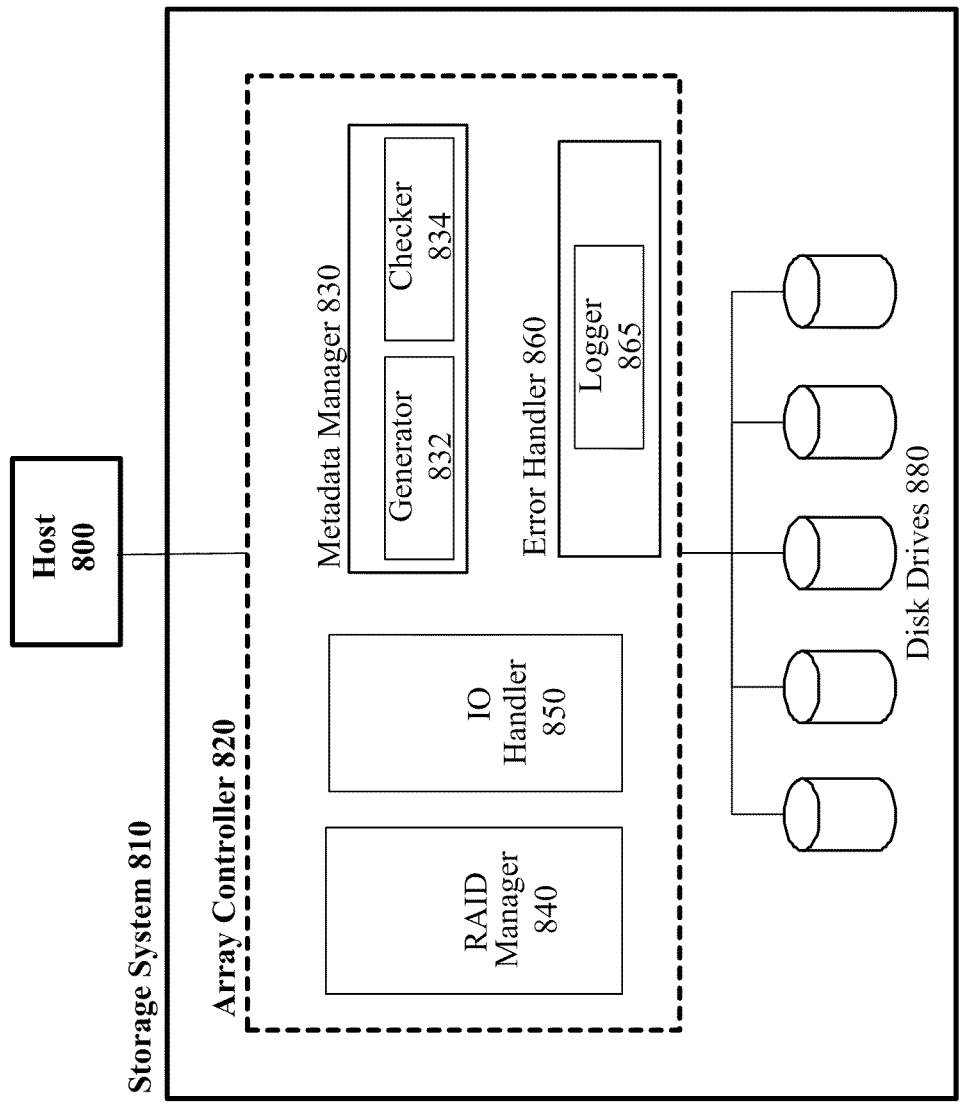
FIG. 8 is an exemplary block diagram of a data storage environment and its components, in accordance with one or more embodiments.

Referring to FIG. 8, an exemplary data storage environment in accordance with one or more embodiments is provided. The data storage environment comprises a storage system 810 and a host (e.g., computing system) 800 that interacts with storage system 810 to read or write data to disk drives 880. In one embodiment, an array controller (i.e., disk controller) 820 is provided to manage and service read and write requests submitted by host 800 to storage system 810 and to also provide error detection and data recovery services.

Array controller 820 may comprise a RAID manager 840, IO handler 850, a metadata manager 830 and an error handle 860. RAID manager 840 is configured to manage the tasks and operations associated with maintaining data on disk drives 880 in a fault tolerant environment. IO handler controls the input and output of data to the array controller 820 according to instructions provided by RAID manager 840.

Metadata manager 830 comprises a generator 832 and checker 834. Metadata generator 832 is configured to generate metadata that is to be stored in data appendices or parity appendices for data chunks stored on disk drives 880. Metadata checker 834 is configured to verify accuracy of metadata stored on disk drives 880 in response to an IO request.

Figure 9:
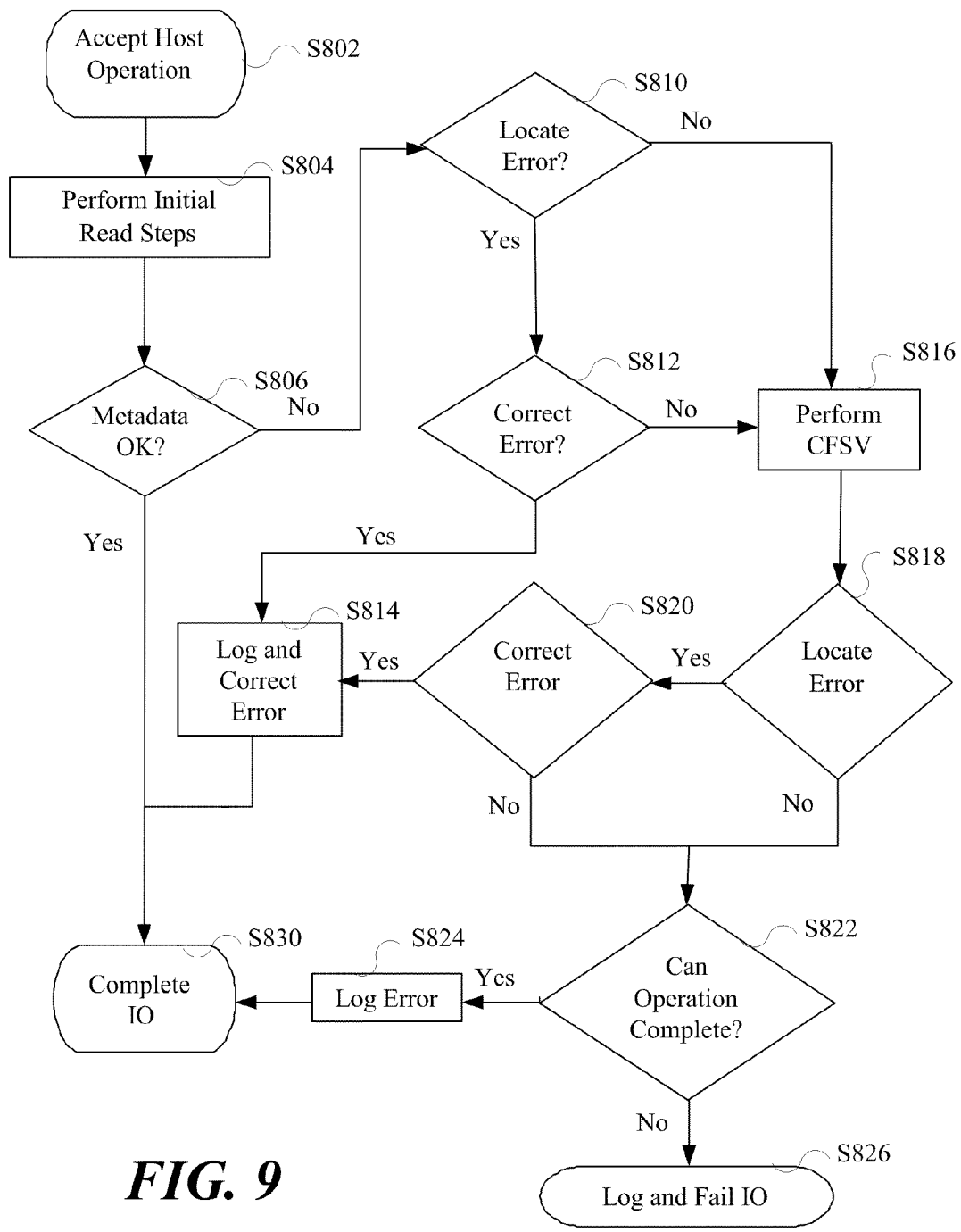
FIG. 9 is a flow diagram of a method of detecting, locating and correcting corrupted data in a data storage system, in accordance with one embodiment.

Referring to FIG. 9, a method for verifying the accuracy of metadata in accordance to one or more embodiments is provided. A host 800 may submit a request for read or write operation to be performed on disk drives 880. Array controller 820 may receive and accept to perform the requested operation (S802).

To perform the requested operation, RAID manager 840 and IO handler 850 cooperate to, for example, read the designated data from data chunks on disk drives 880 (S804) and checker 834 in metadata manager 830 verifies based on the metadata whether data stored in the data chunks is valid by employing one or more data validation methods discussed earlier (S806). If the metadata indicates that the data is valid, then the requested IO operation is completed (S830).

Otherwise, the system attempts to determine the location of the error, preferably by analyzing the metadata and the information embedded therein (S810). If the system is successful in locating and correcting the error, then an entry regarding the location and possibly reason of the error is logged into a database or other data structure (S812-S814).

If the system cannot locate or correct a located error, then the system resorts to perform a CFSV operation as provided earlier in the application to determine the source or cause of the error (S816). If the CFSV operation is successful in finding the cause and location of the error, then the error is corrected (S818-S820). Otherwise, the system determines if the host requested IO operation can be completed without correcting the error (S822).

It should be noted, however, that a method short of a full CFSV may assist in locating an error in certain systems (e.g., RAID6 or higher architectures). For example, during a read operation, one parity appendix metadata may be read. If an error is detected, then the other parity's appendix can be read to assist in locating the error. The noted step can be repeated with each additional parity appendix until some or all the parity appendices have been checked. If these are insufficient, then a full CFSV might be needed.

Referring back to FIGS. 8 and 9, if the IO operation can be performed without locating and correcting the error, then the system logs the error and completes the IO operation (S824-S830). Otherwise, the system will log a failure without performing the requested operation (S826). In some embodiments, the error log is maintained and updated by logger 865 and the metadata is maintained and updated by generator 832 in metadata manager 830.

As will be appreciated by one skilled in the art, one or more aspects may be embodied as a system, method or computer program product. Accordingly, certain aspects may take the form of an entirely hardware embodiment, an entirely software embodiment (including firmware, resident software, micro-code, etc.) or an embodiment combining software and hardware aspects that may all generally be referred to herein as a "circuit," "module" or "system."

Some embodiments may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

Some examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments are provided below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for data validation comprising:
associating a validation chunk with one or more data chunks stored on at least one storage medium, the validation chunk comprising validation information for verifying whether data recorded in a subdivision of the one or more data chunks is lost;
receiving a request for an operation to be performed on first data stored in a first subdivision of a first data chunk from among said one or more data chunks; and
examining one or more portions of the validation information to determine whether the data recorded in said first subdivision is deemed to be lost,
wherein a data chunk comprises Y subdivisions and the validation information comprises N×Y identifiers, wherein N represents number of said one or more data chunks, an identifier corresponding to a respective subdivision on said N data chunks to indicate whether data recorded in a corresponding one of said Y subdivisions is lost,
wherein the validation chunk further comprises Y redundancy data to provide a redundancy check for the N×Y identifiers across N data chunks, and
wherein N and Y are integers greater than 1.

2. The method of claim 1, wherein the first subdivision comprises at least one sector in the storage medium.

3. The method of claim 1, wherein the one or more data chunks and the validation chunk are respectively stored on independent data storage mediums.

4. The method of claim 1, wherein the validation information is stored in a validation appendix of the validation chunk.

5. The method of claim 4, wherein the validation appendix is stored on a storage medium independent of said one or more storage mediums on which the one or more data chunks are stored.

6. The method of claim 1 wherein each of the Y redundancy data comprises a checksum data for a respective set of N identifiers corresponding to said Y subdivisions.

7. A method for data validation comprising:
associating one or more validation data with respectively one or more data chunks stored on one or more storage mediums, each of the one or more data chunks comprising a plurality of subdivisions and each of the one or more validation data comprising a corresponding plurality of identifiers for verifying whether data recorded in a subdivision of said one or more data chunks is lost;
receiving a request for an operation to be performed on first data stored in a first subdivision of a first data chunk from among said one or more data chunks; and
examining a first identifier in first validation data to determine whether the data recorded in said first subdivision is deemed to be lost,
wherein a data chunk comprises Y subdivisions and the validation information comprises N×Y identifiers, wherein N represents number of said one or more data chunks, an identifier corresponding to a respective subdivision on said N data chunks to indicate whether data recorded in a corresponding one of said Y subdivisions is lost,
wherein the validation chunk further comprises Y redundancy data to provide a redundancy check for the N×Y identifiers across N data chunks, and
wherein N and Y are integers greater than 1.

8. The method of claim 7, wherein the first identifier in the first validation data is associated with the first data stored in the first subdivision of the first data chunk.

9. A system for data validation comprising:
one or more processors for validating data;
one or more storage mediums on which one or more data chunks are stored;
wherein a validation chunk is associated with said one or more data chunks, the validation chunk comprising validation information for verifying whether data recorded in a subdivision of the one or more data chunks is lost;
wherein in response to receiving a request for an operation to be performed on first data stored in a first subdivision of a first data chunk from among said one or more data chunks, one or more portions of the validation information are examined to determine whether the data recorded in said first subdivision is deemed to be lost,
wherein a data chunk comprises Y subdivisions and the validation information comprises N×Y identifiers, wherein N represents number of said one or more data chunks, an identifier corresponding to a respective subdivision on said N data chunks to indicate whether data recorded in a corresponding one of said Y subdivisions is lost,
wherein the validation chunk further comprises Y redundancy data to provide a redundancy check for the N×Y identifiers across N data chunks, and
wherein N and Y are integers greater than 1.

10. The system of claim 9, wherein the first subdivision comprises at least one sector in a data storage medium.

11. The system of claim 9, wherein the one or more data chunks and the validation chunk are respectively stored on one or more independent data storage mediums.

12. A computer program product comprising a non-transient computer readable storage medium having a computer readable code stored thereon, wherein the computer readable code when executed on a computer causes the computer to:
associate one or more validation data with respectively one or more data chunks stored on one or more storage mediums, each of the one or more data chunks comprising a plurality of subdivisions and each of the one or more validation data comprises a corresponding plurality of identifiers for verifying whether data recorded in a subdivision of one or more data chunks from among said one or more data chunks is lost;
receive a request for an operation to be performed on first data stored in a first subdivision of a first data chunk from among said one or more data chunks; and
examine a first identifier in first validation data to determine whether the data recorded in said first subdivision is deemed to be lost,
wherein a data chunk comprises Y subdivisions and the validation information comprises N×Y identifiers, wherein N represents number of said one or more data chunks, an identifier corresponding to a respective subdivision on said N data chunks to indicate whether data recorded in a corresponding one of said Y subdivisions is lost,
wherein the validation chunk further comprises Y redundancy data to provide a redundancy check for the N×Y identifiers across N data chunks, and
wherein N and Y are integers greater than 1.

13. The computer program product of claim 12, wherein the first subdivision comprises at least one sector in a data storage medium.

14. The computer program product of claim 12, wherein the one or more data chunks and the validation chunk are respectively stored on one or more independent data storage mediums.

* * * * *

UNITED STATES PATENT AND TRADEMARK OFFICE
CERTIFICATE OF CORRECTION

| | |
|---|---|
| PATENT NO. | : 8,751,859 B2 |
| APPLICATION NO. | : 13/196904 |
| DATED | : June 10, 2014 |
| INVENTOR(S) | : Ralph A. Becker-Szendy et al. |

It is certified that error appears in the above-identified patent and that said Letters Patent is hereby corrected as shown below:

Specification:

Insert after the title but before the Cross Reference to Related Applications--

--This invention was made with Government support under HR0011-07-9-0002 awarded by Defense Advanced Research Projects Agency (DARPA). The Government has certain rights in this invention.--

Signed and Sealed this
Twenty-sixth Day of May, 2015

Michelle K. Lee
*Director of the United States Patent and Trademark Office*